US010001650B2

(12) United States Patent
Iba et al.

(10) Patent No.: US 10,001,650 B2
(45) Date of Patent: Jun. 19, 2018

(54) ATTACHABLE IMAGE DISPLAY DEVICE AND OCULAR OPTICAL SYSTEM

(71) Applicant: KOPIN CORPORATION, Westborough, MA (US)

(72) Inventors: Yoichi Iba, Hachioji (JP); Hideki Tomine, Machida (JP)

(73) Assignee: KOPIN CORPORATION, Westborough, MA (US)

( * ) Notice: Subject to any disclaimer, the term of this patent is extended or adjusted under 35 U.S.C. 154(b) by 0 days. days.

(21) Appl. No.: 15/385,861

(22) Filed: Dec. 20, 2016

(65) Prior Publication Data

US 2017/0227772 A1    Aug. 10, 2017

(30) Foreign Application Priority Data

Dec. 28, 2015 (JP) ................................. 2015-255718

(51) Int. Cl.
| | |
|---|---|
| *G02B 27/14* | (2006.01) |
| *G09G 5/00* | (2006.01) |
| *G02B 27/01* | (2006.01) |
| *G02B 5/04* | (2006.01) |
| *G02B 27/00* | (2006.01) |
| *G02B 17/08* | (2006.01) |

(52) U.S. Cl.
CPC ............ *G02B 27/0172* (2013.01); *G02B 5/04* (2013.01); *G02B 17/086* (2013.01); *G02B 27/0018* (2013.01); *G02B 2027/012* (2013.01); *G02B 2027/0178* (2013.01)

(58) Field of Classification Search
CPC ............ G02B 2027/0178; G02B 27/01; G02B 27/0101; G02B 27/017; G02B 27/0172; G02B 27/0176
USPC .................................. 359/630–631; 345/7–9
See application file for complete search history.

(56) References Cited

U.S. PATENT DOCUMENTS

| | | | |
|---|---|---|---|
| 2002/0101643 A1 | 8/2002 | Kobayashi | |
| 2007/0058261 A1 | 3/2007 | Sugihara et al. | |
| 2010/0245211 A1* | 9/2010 | Iba ....................... | G02B 17/006 345/8 |

(Continued)

FOREIGN PATENT DOCUMENTS

| | | |
|---|---|---|
| JP | 2002-196277 A | 7/2002 |
| JP | 2005-316087 A | 11/2005 |

(Continued)

*Primary Examiner* — William Choi
(74) *Attorney, Agent, or Firm* — Peloquin, PLLC; Mark S. Peloquin, Esq.

(57) ABSTRACT

An attachable image display device includes a light guiding prism that guides image light from a display element, and an eyepiece that emits the image light guided by the light guiding prism, wherein the light guiding prism includes an outer peripheral surface, and a reflection surface off which the image light is reflected to the eyepiece; and a portion of or the entirety of an intersection line of the outer peripheral surface and a plane including an optical axis of the image light before the image light is reflected off the reflection surface has a negative inclination angle to the optical axis in a direction downstream of the light path, and a tangential inclination angle of the portion of or the entirety of the intersection line becomes gradually larger from an upstream side to a downstream side of the light path.

9 Claims, 13 Drawing Sheets

(56) References Cited

U.S. PATENT DOCUMENTS

2013/0134301 A1  5/2013  Takahashi
2014/0225813 A1  8/2014  Komatsu et al.

FOREIGN PATENT DOCUMENTS

| JP | 2006-003879 A | 1/2006 |
| JP | 2012-027350 A | 2/2012 |
| JP | 2014-153644 A | 8/2014 |
| JP | 2015-087742 A | 5/2015 |
| JP | 2015-135506 A | 7/2015 |

* cited by examiner

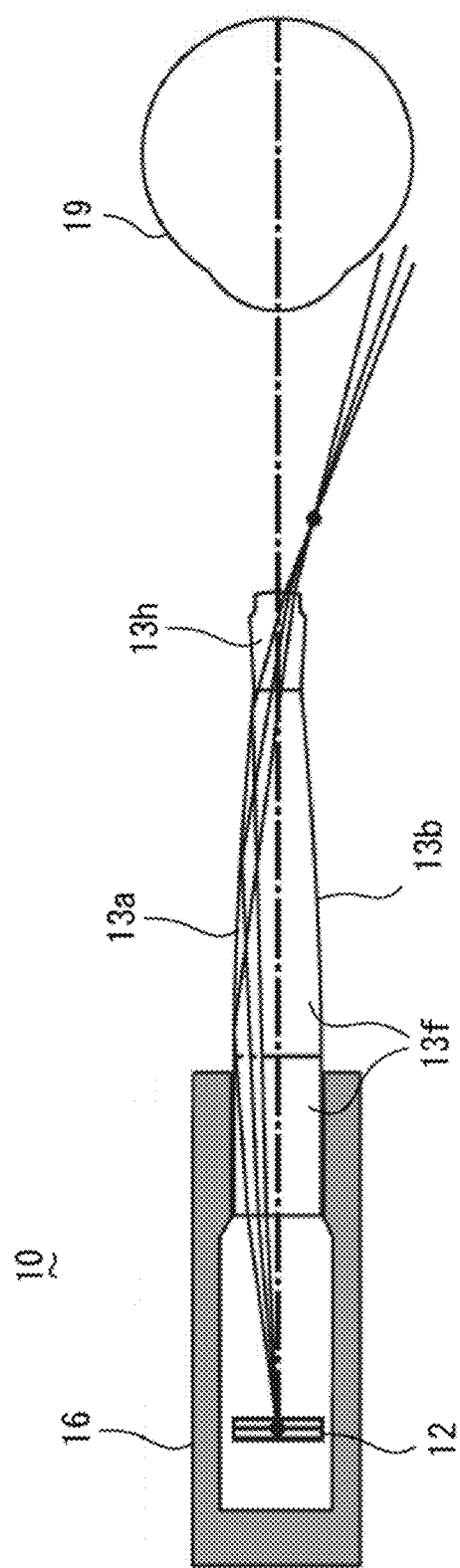
F I G. 6

ATTACHABLE IMAGE DISPLAY DEVICE AND OCULAR OPTICAL SYSTEM

This application is based upon and claims the benefit of priority of the prior Japanese Patent Application No. 2015-255718, filed Dec. 28, 2015, the entire contents of which are incorporated herein by reference.

BACKGROUND OF THE INVENTION

1. Field

The present disclosure relates to an attachable image display device that includes a light guiding prism, and an ocular optical system that includes a light guiding prism.

2. Background

Small attachable image display devices that are used attached to, for example, glasses have attracted attention in recent years. An attachable image display device includes, for example, a display element and an ocular optical system including a light guide prism, and it guides image light from the display element and emits the image light to an eye of a user, so as to display a display image of the display element in a field of view of a user.

Light guiding prisms have been made smaller and thinner because they are provided over a field of view of a user. However, unnecessary reflected light is created in a prism due to the prism being made smaller and thinner, which may result in forming, in the eye of the user, an image created with light other than image light that is to be originally generated (hereinafter referred to as a ghost image).

FIG. 1 is a perspective view of examples of a display element and an ocular optical system that are included in a conventional attachable image display device. FIG. 2 is a perspective view of the ocular optical system as viewed from a different direction than that of FIG. 1. FIG. 3 is a diagram that illustrates an example of a beam that is emitted from the center of a display area of the display element and passes through cross sections of the ocular optical system.

In FIGS. 1 to 3, an ocular optical system 1 includes a light guiding prism 3 that guides image light from a display element 2, and an eyepiece 4 that emits the image light guided by the light guiding prism 3 to an eye of a user.

The light guiding prism 3 includes four sides 3a, 3b, 3c, and 3d that are arranged to surround a light path of the image light from the display element 2, and a reflection surface 3e off which the image light from the display element 2 is reflected to the eyepiece 4.

The eyepiece 4 includes an emission surface 4a that has a positive refractive power, and the emission surface 4a emits the image light reflected off the reflection surface 3e.

An optical axis 5 (5a and 5b) is a beam emitted from the center of a display area of the display element 2 to pass through the center of the emission surface 4a of the eyepiece 4 without being reflected off any surface other than the reflection surface 3e. It is assumed that, in the beam, a portion of the beam before the beam is reflected off the reflection surface 3e is the optical axis 5a and a portion of the beam after the beam is reflected off the reflection surface 3e is the optical axis 5b.

The sides 3a and 3b of the light guiding prism 3 are surfaces arranged parallel to a plane including the optical axes 5a and 5b. The sides 3c and 3d of the light guiding prism 3 are surfaces that are parallel to the optical axis 5a and perpendicular to the plane including the optical axes 5a and 5b.

A cross section 3f of the light guiding prism 3 is a cross section formed by a line of intersection of the light guiding prism 3 and a plane that includes the optical axis 5a and that is perpendicular to the plane including the optical axes 5a and 5b. A cross section 3g of the light guiding prism 3 is a cross section formed by a line of intersection of the light guiding prism 3 and a plane that is perpendicular to the optical axis 5a and that is situated closer to the display element 2 than the eyepiece 4. A cross section 3h of the light guiding prism 3 and a cross section 4b of the eyepiece 4 are cross sections formed by a line of intersection of the light guiding prism 3 and a plane that includes the optical axis 5b and that is perpendicular to the plane including the optical axes 5a and 5b. The cross sections 3f, 3g and 3h each have a rectangular or square shape. The cross sections 3f, 3g, 16h, and 4b are also cross sections of the ocular optical system 1.

For example, as illustrated in FIG. 3, when a beam is emitted from the center of the display area of the display element 2 and passes through each of the cross sections 3f, 3h, and 4b of the ocular optical system 1, the ocular optical system 1 having the configuration described above may cause the beam reflected off the side 3a (or the side 3b) of the light guiding prism 3 to enter a pupil of the user (a pupil of an eye 6). In this case, a ghost image is generated in the field of view of the user due to the beam. In particular, an area situated between the reflection surface 3e and the eyepiece 4 at the side 3a (or the side 3b) of the light guiding prism 3 is close to the eyepiece 4, so light reflected off the area will generate a stronger ghost image.

Such a ghost image is generated more easily due to the light guiding prism 3 being made smaller and thinner.

Thus, in an attachable image display device that includes an ocular optical system including a small and thin light guiding prism, a ghost image generated due to light reflected off a side of the light guiding prism is desired to be removed or reduced.

SUMMARY

An aspect of the present disclosure provides an attachable image display device that includes a display element, a light guiding prism that guides image light from the display element, and an emission portion that emits the image light guided by the light guiding prism, wherein the light guiding prism includes an outer peripheral surface arranged to surround a light path of the image light, and a reflection surface off which the image light is reflected to the emission portion; the emission portion emits the image light reflected off the reflection surface; and a portion of or the entirety of an intersection line of the outer peripheral surface and a plane including a first optical axis of the image light before the image light is reflected off the reflection surface has a negative inclination angle to the first optical axis in a direction downstream of the light path, and a tangential inclination angle of the portion of or the entirety of the intersection line becomes gradually larger from an upstream side to a downstream side of the light path.

An aspect of the present disclosure provides an ocular optical system that includes a light guiding prism that guides light, and an emission portion that emits the light guided by the light guiding prism, wherein the light guiding prism includes an outer peripheral surface arranged to surround a light path of the light, and a reflection surface off which the light is reflected to the emission portion; the emission portion emits the light reflected off the reflection surface; and a portion of or the entirety of an intersection line of the outer peripheral surface and a plane including a first optical axis of the light before the light is reflected off the reflection surface has a negative inclination angle to the first optical axis in a direction downstream of the light path, and a tangential inclination angle of the portion of or the entirety of the intersection line becomes gradually larger from an upstream side to a downstream side of the light path.

BRIEF DESCRIPTION OF THE DRAWINGS

The present invention will be more apparent from the following detailed description when the accompanying drawings are referenced

FIG. 6 illustrates an example of a light path that passes through cross sections of the ocular optical system according to the embodiments of the present disclosure;

DESCRIPTION OF EMBODIMENTS

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

A configuration that is common to attachable image display devices according to embodiments of the present disclosure will be described with reference to FIGS. 4 to 6.

Figure 1:
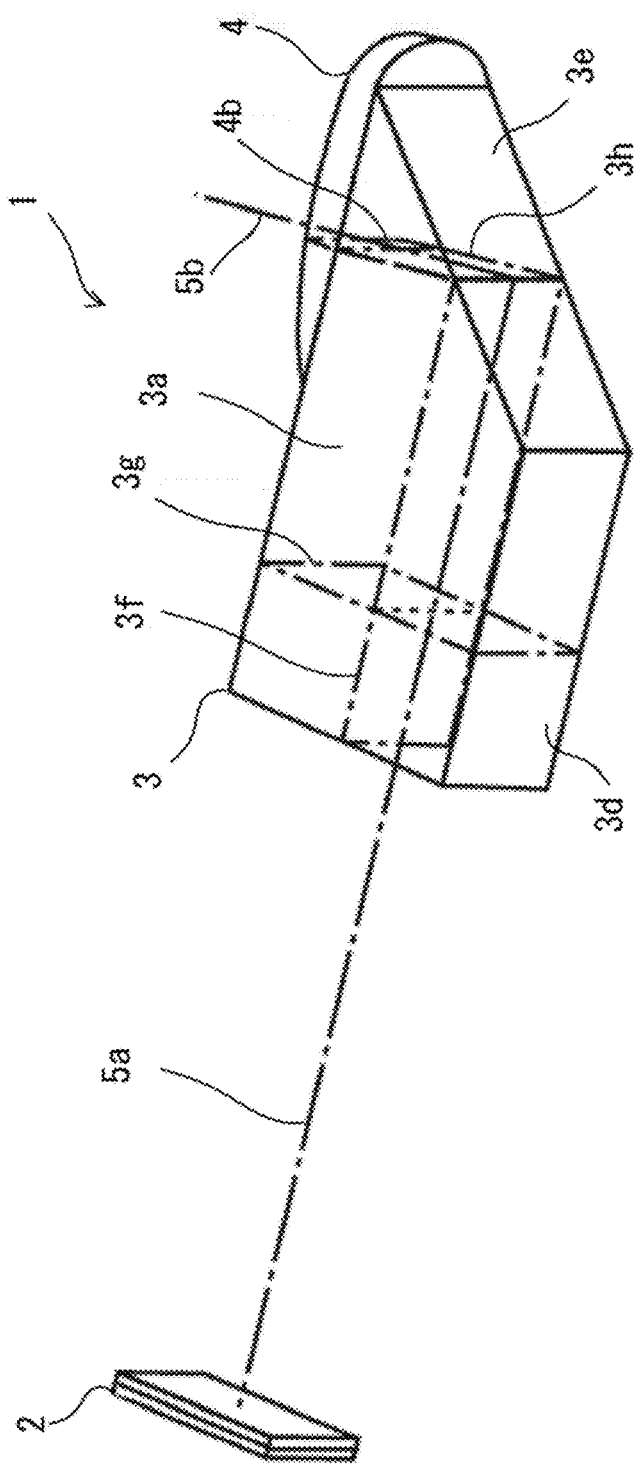
FIG. 1 is a perspective view of a display element and an ocular optical system that are included in a conventional attachable image display device.
Figure 2:
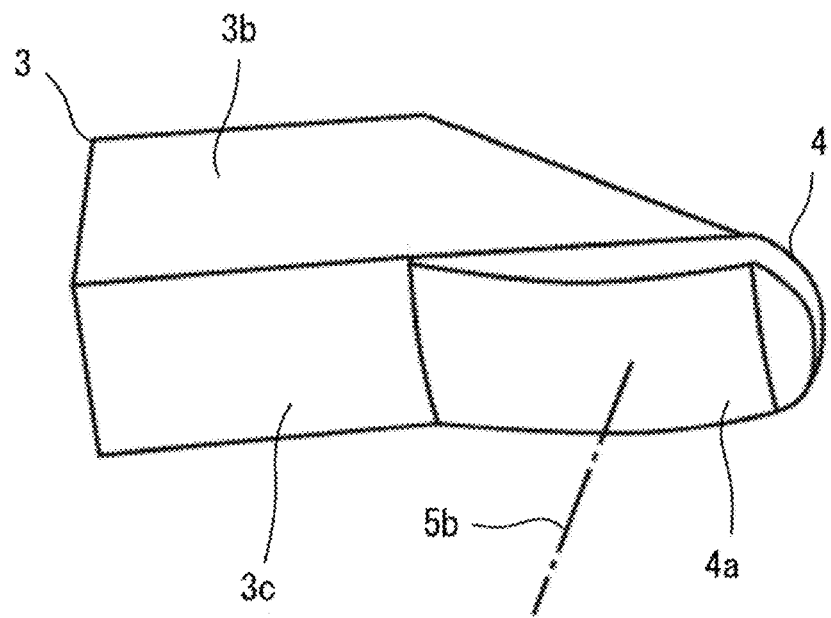
FIG. 2 is a perspective view of the ocular optical system included in the conventional attachable image display device as viewed from a different direction than that of FIG. 1.
Figure 3:
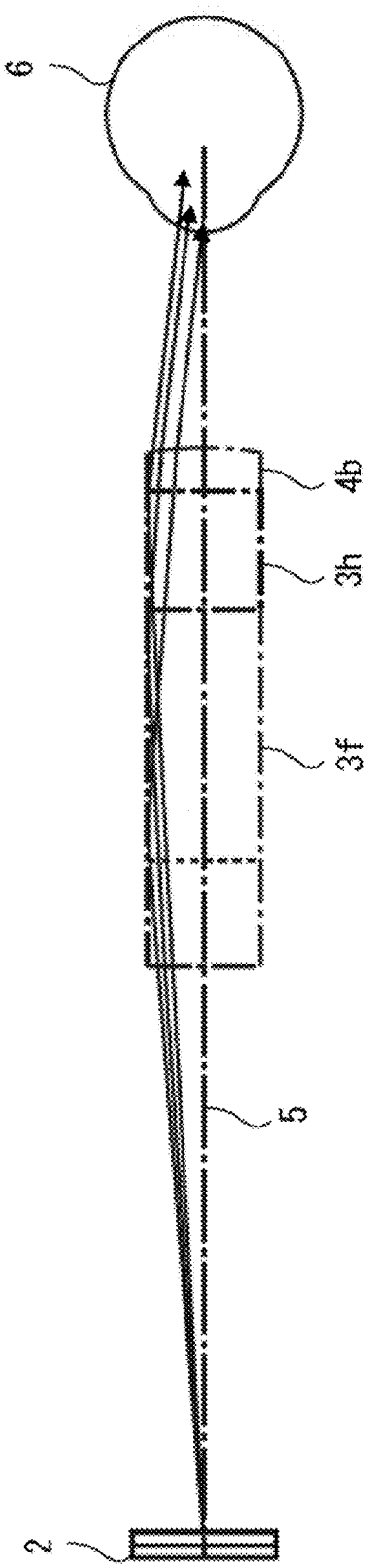
FIG. 3 is a diagram that illustrates an example of a beam that is emitted from the center of a display area of the display element and passes through cross sections of the ocular optical system.
Figure 4:
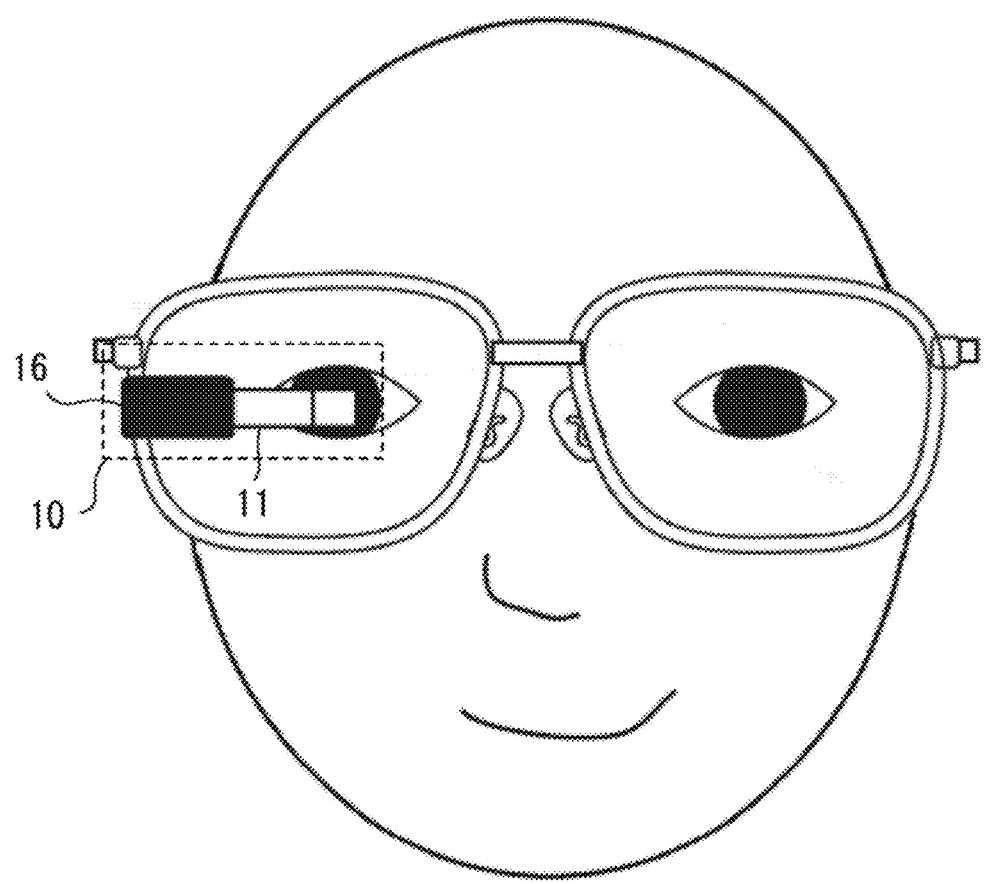
FIG. 4 illustrates an example of an attachment of an attachable image display device according to embodiments of the present disclosure.

FIG. 4 illustrates an example of an attachment of an attachable image display device 10 according to embodiments of the present disclosure. The attachable image display device 10 includes a display element (not illustrated) arranged within a housing 16, and an ocular optical system 11 whose portion is fixed on the housing 16. The attachable image display device 10 is arranged such that, for example, the housing 16 is fixed on a rim of glasses and the ocular optical system 11 is situated in front of a pupil of a user, as illustrated in FIG. 4. Then, image light emitted from the display element is guided by the ocular optical system 11 to the pupil of the user.

Figure 5:
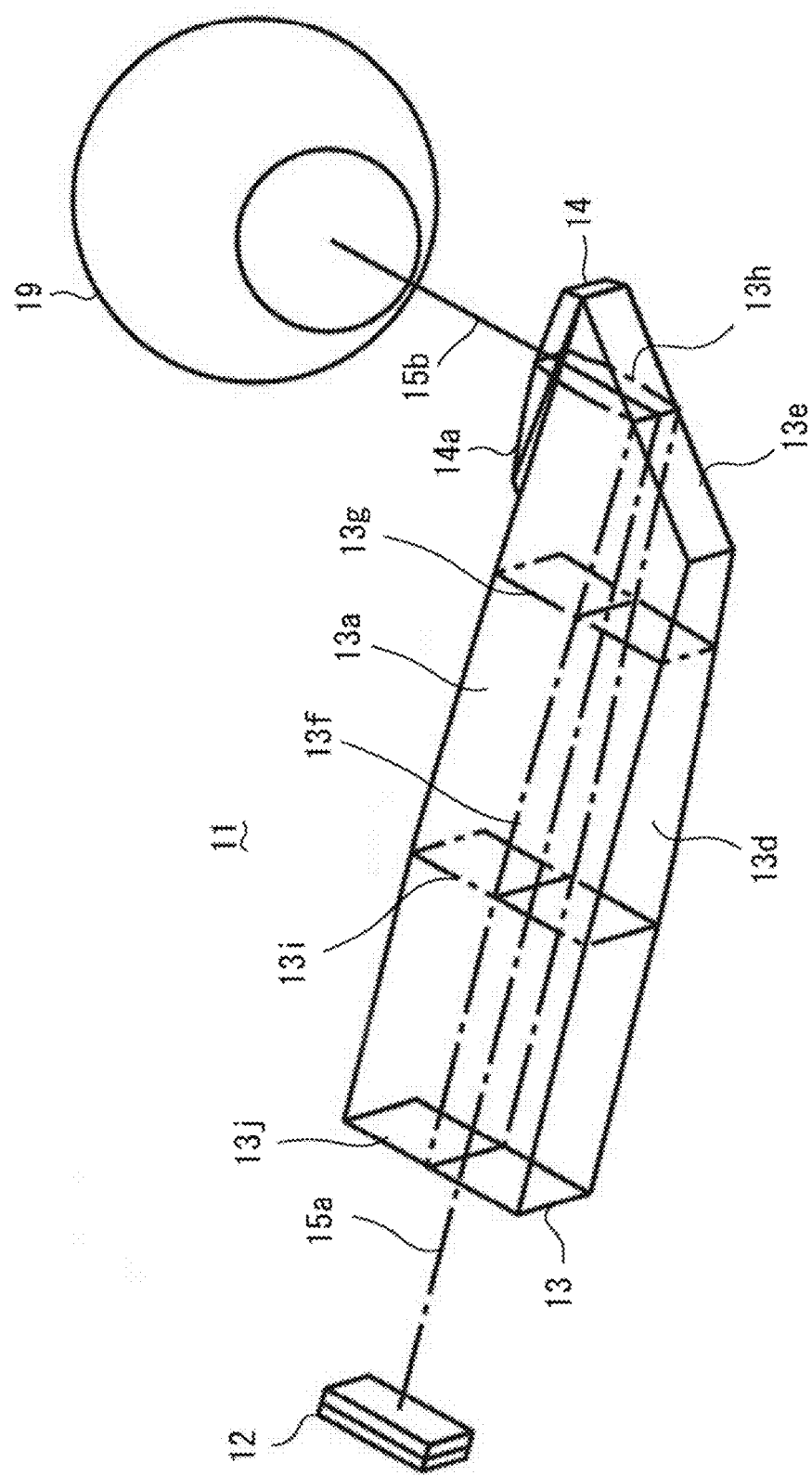
FIG. 5 is a perspective view of examples of a display element and an ocular optical system that are included in the attachable image display device according to the embodiments of the present disclosure.

FIG. 5 is a perspective view of examples of a display element 12 and the ocular optical system 11 that are included in the attachable image display device 10 according to the embodiments of the present disclosure. The ocular optical system 11 includes a light guiding prism 13 that guides image light from the display element 12, and an eyepiece 14 that serves as an emission portion that emits the image light guided by the light guiding prism 13 to an eye 19 of the user.

The light guiding prism 13 includes an incident surface 13j on which the image light from the display element 12 is incident, an outer peripheral surface that is arranged to surround a light path of the image light from the display element 12, and a reflection surface 13e off which the image light from the display element 12 is reflected to the eyepiece 14. The outer peripheral surface is constituted of four sides 13a, 13b (not illustrated), 13c (not illustrated), and 13d. The side 13b is a side that is arranged on an opposite side of the side 13a, and the side 13c is a side that is arranged on an opposite side of the side 13d. Portions of the sides 13a to 13d constituting the outer peripheral surface are fixed by the housing 16 on the side of the display element 12, as illustrated in FIG. 4.

The eyepiece 14 includes an emission surface 14a and emits image light to the pupil of the eye 19 of the user through the emission surface 14a.

Optical axes 15a and 15b are axes of image light that is emitted from the center of a display area of the display element 12 and emitted from the center of the emission surface 14a of the eyepiece 14 without being reflected off any portion included in the ocular optical system 11 other than the reflection surface 13e. The optical axis 15a is an optical axis of the image light before the image light is reflected off the reflection surface 13e, and the optical axis 15b is an optical axis of the image light after the image light is reflected off the reflection surface 13e. In the following descriptions, the side of the display element 12 is referred to as "upstream" and the opposite side of the display element 12 is referred to as "downstream" in parallel with a light path of image light that passes through the optical axes 15a and 15b.

The sides 13a and 13b of the light guiding prism 13 are sides arranged on opposite sides of a plane including the optical axes 15a and 15b (hereinafter referred to as a first plane). An intersection line of a plane that includes the optical axis 15a and that is perpendicular to the first plane (hereinafter referred to as a second plane), and a portion of the side 13a (or the side 13b) that is exposed from the housing 16 has a negative inclination angle to the optical axis 15a in a direction downstream of the optical axis 15a. The configuration is made such that the tangential inclination angle of the intersection line becomes gradually larger from an upstream side to a downstream side of the optical axis 15a.

The sides 13c and 13d of the light guiding prism 13 are surfaces that are arranged on opposite sides of the second plane and parallel to the second plane. At least portions of the sides 13c and 13d that are exposed from the housing 16 are polished, which makes it possible to view the outside world from the user's eye through the sides 13c and 13d.

A cross section 13f of the light guiding prism 13 is a cross section formed by a line of intersection of the light guiding prism 13 and second plane. A cross section 13h of the light guiding prism 13 is a cross section formed by a line of intersection of the light guiding prism 13 and a plane that includes the optical axis 15b and that is perpendicular to the first plane (hereinafter referred to as a third plane). A cross section 13g of the light guiding prism 13 is a cross section formed by a line of intersection of the light guiding prism 13 and a plane perpendicular to the first plane and the second plane at a portion of the light guiding prism 13 that is exposed from the housing 16. A cross section 13i of the light guiding prism 13 is a cross section formed by a line of intersection of the light guiding prism 13 and a plane perpendicular to the first plane and the second plane at a portion of the light guiding prism 13 that is held by the housing 16.

The attachable image display device 10 having the configuration described above makes it possible to remove or reduce a ghost image generated due to light reflected off the side 13a (or the side 13b) of the light guiding prism 13.

FIG. 6 illustrates an example of a light path that passes through cross sections of the ocular optical system 11 according to the embodiments of the present disclosure. The intersection line of the second plane and the side 13a (or the side 13b) has a negative inclination angle, so light reflected off the side 13a (or the side 13b) will move in a direction deviating from the pupil of the eye 19 of the user. This provides the advantage of removing or reducing a ghost image generated due to light reflected off the side 13a (or the side 13b).

Figure 7:
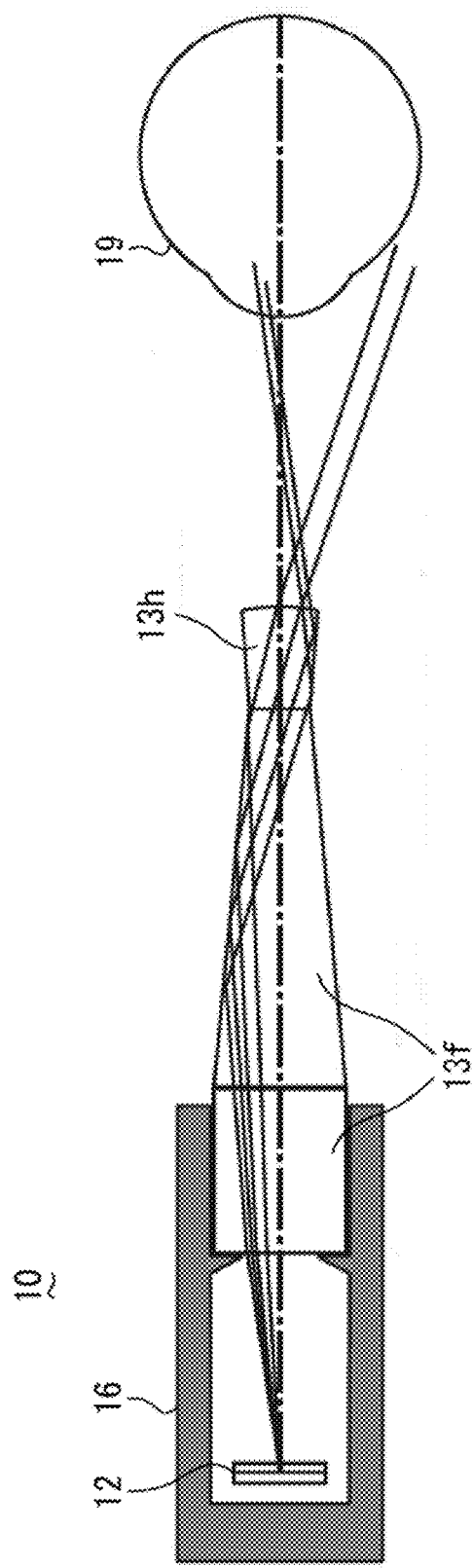
FIG. 7 illustrates an example of a beam that is emitted from the center of the display area of the display element to pass through the cross sections of the ocular optical system when sides of the light guiding prism of FIG. 6 are flat surfaces.

On the other hand, FIG. 7 illustrates a configuration of the attachable image display device that is different from the above-described configuration of the embodiments of the present disclosure. As illustrated in FIG. 7, if the intersection line of the second plane and each of the sides 13a and 13b has a negative inclination angle but the tangential inclination angle of the intersection line is constant, that is, if the intersection line has a negative inclination angle but the sides 13a and 13b are flat surfaces, a ghost image may be generated due to light reflected off the side 13a or the side 13b. FIG. 7 illustrates an example of a beam that is emitted from the center of the display area of the display element 12 to pass through the cross section 13f and the cross section 13h of the ocular optical system 11 when the sides 13a and 13b are flat surfaces as described above.

In the configuration illustrated in FIG. 7, light reflected off the side 13a (or the side 13b) moves in a direction deviating from the pupil of the eye 19 of the user, but the light is a divergent light flux which is spreading in a vertical direction in FIG. 7, so there may be a beam that is reflected again off the outer peripheral surface in the light guiding prism 13 before it passes though the eyepiece 14. As a result, the light which is reflected multiple times in the light guiding prism 13 is emitted from the emission surface 14a of the eyepiece 14 to the eye 19 of the user, so as to generate a ghost image.

The attachable image display device 10 according to the embodiments of the present disclosure described in FIGS. 4 to 6 has a configuration in which, in an area of the light guiding prism 13 that is exposed from the housing 16, not only does the intersection line of the second plane and the side 13a (or the side 13b) have a negative inclination angle but also the tangential inclination angle of the intersection line of the second plane and the side 13a (or the side 13b) becomes gradually larger from the downstream side to the upstream side. This provides the advantage of preventing multiple reflections onto the outer peripheral surface in the light guiding prism 13. Specifically, the configuration in which the tangential inclination angle of the intersection line of the second plane and the side 13a (or the side 13b) becomes gradually larger from the downstream side to the upstream side permits light reflected off the side 13a (or the side 13b) to be collected or collimated with a lower aberration compared with the configuration of FIG. 7, with the result that the light can pass through the ocular optical system 11 without light flux spreading so as to reach the eyepiece 14 without being reflected again in the ocular optical system 11.

In other words, the inclusion of the two factors of the intersection line of the second plane and the side 13a (or the side 13b) having a negative inclination angle and the tangential inclination angle of the intersection line becoming gradually larger makes it possible to effectively remove or reduce a ghost image generated due to light reflected off the side 13a (or the side 13b) of the light guiding prism 13.

Further, the tangential inclination angle of the intersection line of the second plane and the side 13a (or the side 13b) is smaller toward the upstream side, which prevents the housing 16 that fixes the light guiding prism 13 from becoming larger, compared to the configuration in which an outer peripheral surface that is a plane just having a negative inclination angle is included. Preferably, an area of the outer peripheral surface of the light guiding prism 13 that is fixed by the housing 16 is an area which is not reached by image light from the center of the display area of the display element 12 and in which reflected light is not generated, the area being situated closer to the display element 12. In this case, the side 13a (or the side 13b) in the area does not have to have the characteristics described above, and, for example, it may be a plane parallel to the first plane.

The configuration may be made such that an intersection line of the second plane and an entire area of the side 13a (or the side 13b) has a negative inclination angle to the optical axis 15a and the tangential inclination angle of the intersection line becomes gradually larger. Also in this case, the tangential inclination angle of the intersection line of the second plane and the side 13a (or the side 13b) is smaller on the upstream side, so the housing 16 will not be made larger.

The side 13a (or the side 13b) may be, for example, a curved surface which has a gradually greater curvature toward the downstream side of the optical axis 15a. A curved surface prevents reflected light from becoming a divergent light flux, which results in preventing multiple reflections in the ocular optical system 11 more effectively.

Both of the sides 13a and 13b may have the characteristics of the side 13a described above. In other words, the configuration may be made such that the intersection line of the second plane and each of the sides 13a and 13b has a negative inclination angle to the optical axis 15a in the direction downstream of the optical axis 15a and the tangential inclination angle of the intersection line becomes gradually larger from the upstream side to the downstream side of the optical axis 15a.

The emission surface 14a of the eyepiece 14 may have a positive refractive power. If the emission surface 14a has a positive refractive power, this will act to collect more light reflected off the side 13a (or the side 13b) to divert it from the pupil of the eye 19 of the user, which results in being able to remove or reduce a ghost image more effectively.

An intersection line of the third plane and the side 13a (or the side 13b) preferably has a positive inclination angle to the first plane in a direction downstream of the optical axis 15b. This makes it difficult for light to reach the side 13a (or the side 13b) in an area situated between the eyepiece 14 and the reflection surface 13e, which makes it possible to remove or reduce a ghost image generated due to light reflected off the area.

An attachable image display device 20 according to a first embodiment that uses the above-described configuration of the attachable image display device 10 according to the embodiments of the present disclosure will now be described. Constituent elements of the attachable image display device 20 according to the present embodiment are similar to those of the attachable image display device 10 described in FIGS. 4 to 6, so each of the constituent elements is numbered identically so as to be described in the following figures.

Figure 8:
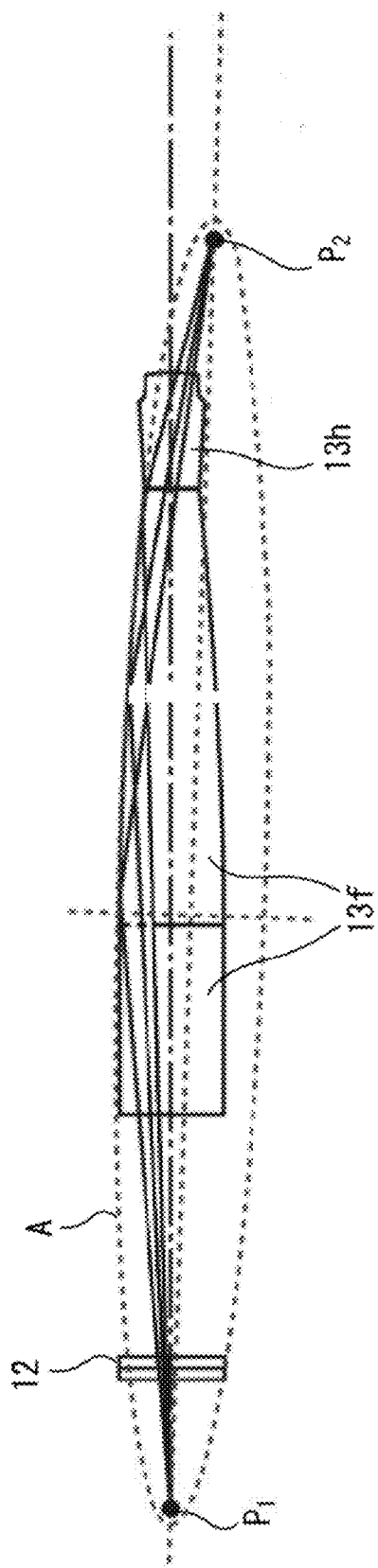
FIG. 8 illustrates an example of a light path that passes through the cross sections of the ocular optical system, the light path being a dummy light path of image light that generates a virtual image on an extension of the display element of the attachable image display device according to a first embodiment.

FIG. 8 illustrates an example of a light path that passes through the cross section 13f and the cross section 13h of the ocular optical system 11, the light path being a dummy light path of image light that generates a virtual image on an extension of the display element 12 of the attachable image display device 20 according to the present embodiment.

The intersection line of the second plane and the portion of the side 13a of the light guiding prism 13 that is exposed from the housing 16 has a curved surface that overlaps a portion of the circumference of an ellipse A, as illustrated in FIG. 8. In this case, the attachable image display device 20 is configured such that the center of a display area of a virtual image of the display element 12 overlaps a first focal point $P_1$ of the ellipse A, the virtual image being generated due to image light that passes through the incident surface 13j of the light guiding prism 13. In this configuration, image light reflected off the portion of the side 13a that is exposed from the housing 16 is collected into a second focal point $P_2$ of the ellipse A. The eyepiece 14 is configured to be situated near the second focal point $P_2$ of the ellipse A.

The side 13b of the light guiding prism 13 or both of the sides 13a and 13b may have the characteristics of the side 13a described above. The case in which the side 13b has the characteristics described above is a case in which an intersection line of the second plane and a portion of the side 13b that is exposed from the housing 16 has a curved surface that overlaps a portion of the circumference of an ellipse (not illustrated). In this case, the attachable image display device 20 is configured such that a first focal point of the ellipse overlaps the center of the display area of the virtual image of the display element 12, the virtual image being generated due to image light that passes through the incident surface 13j of the light guiding prism 13. In this configuration, image light reflected off the portion of the side 13b that is exposed from the housing 16 is collected into a second focal point of the ellipse. The eyepiece 14 is configured to be situated near the second focal point of the ellipse.

The attachable image display device 20 according to the first embodiment also makes it possible to remove or reduce a ghost image generated due to light reflected off the side 13a (or the side 13b) of the light guiding prism 13. In the attachable image display device 20, image light reflected off the portion of the side 13a (or the side 13b) which is exposed from the housing 16 is collected near the eyepiece 14 with an extremely low aberration, with the result that the image light passes through the eyepiece 14 more definitely. This prevents multiple reflections onto the outer peripheral surface in the light guiding prism 13 more effectively.

The intersection line of the second plane and the entire area of the side 13a (or the side 13b) may have a curved surface that overlaps a portion of the circumference of an ellipse. In this case, the attachable image display device 20 is configured such that the center of the display area of the virtual image of the display element 12 overlaps a first focal point of the ellipse, the virtual image being generated due to image light that passes through the incident surface 13j of the light guiding prism 13.

Figure 9:
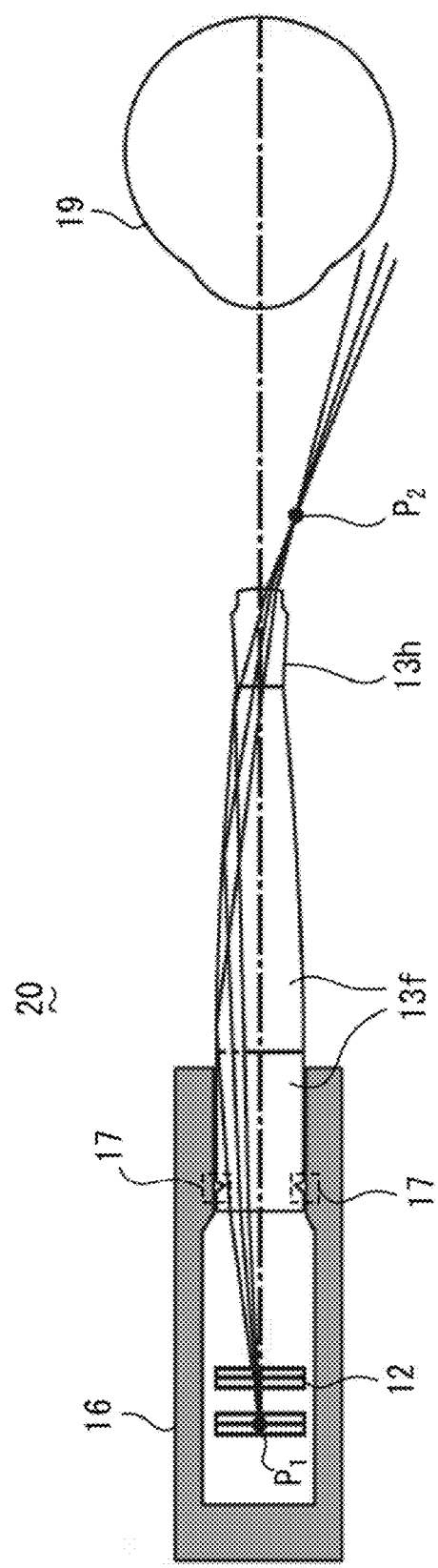
FIG. 9 illustrates an example of a light path that passes through the cross sections of the ocular optical system, the light path being a dummy light path of image light that generates a virtual image on an extension of the display element according to a modification of the first embodiment.

As illustrated in FIG. 9, a groove 17 that is a light blocking portion may be provided in the area of the outer peripheral surface of the light guiding prism 13 that is fixed by the housing 16 and that is situated closer to the display element 12. The groove 17 serves to remove light that reaches a portion of the outer peripheral surface of the light guiding prism 13 that is fixed by the housing 16. The presence of the groove 17 makes it possible to remove, in advance, light reflected off the area of the outer peripheral surface so as to generate a ghost image, the area being situated closer to the display element 12.

The emission surface 14a of the eyepiece 14 may have a positive refractive power. If the emission surface 14a has a positive refractive power, this will act to collect more light reflected off the side 13a (or the side 13b) to divert it from the pupil of the eye 19 of the user, which results in being able to remove or reduce a ghost image more effectively.

An attachable image display device 30 according to a second embodiment of the present disclosure will now be described. Constituent elements of the attachable image display device 30 according to the present embodiment are similar to those of the attachable image display device 10 described in FIGS. 4 to 6, so each of the constituent elements is numbered identically so as to be described in the following figures.

Figure 10:
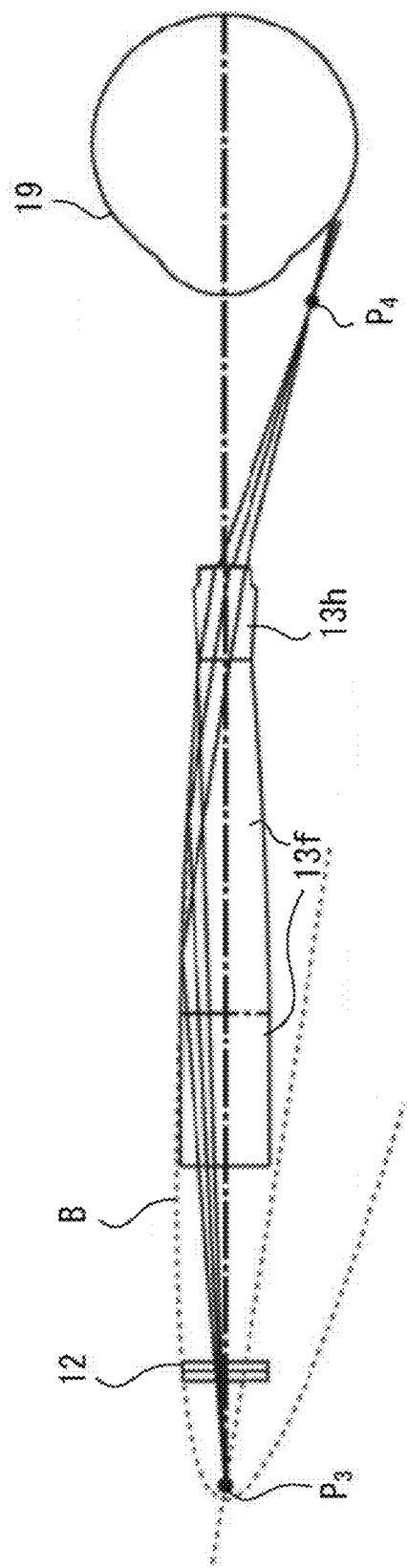
FIG. 10 illustrates an example of a light path that passes through the cross sections of the ocular optical system, the light path being a dummy light path of image light that generates a virtual image on an extension of the display element of the attachable image display device according to a second embodiment.

FIG. 10 illustrates an example of a light path that passes through the cross section 13f and the cross section 13h of the ocular optical system 11, the light path being a dummy light path of image light that generates a virtual image on an extension of the display element 12 of the attachable image display device 30 according to the present embodiment. The intersection line of the second plane and the portion of the side 13a of the light guiding prism 13 that is exposed from the housing 16 has a curved surface that overlaps a portion of a parabola B, as illustrated in FIG. 9. In this case, the attachable image display device 30 is configured such that the center of a display area of a virtual image of the display element 12 overlaps a focal point $P_3$ of the parabola B, the virtual image being generated due to image light that passes through the incident surface 13j of the light guiding prism 13. The emission surface 14a of the eyepiece 14 has a positive refractive power. In this configuration, image light reflected off the portion of the side 13a that is exposed from the housing 16 is collected into a fourth focal point $P_4$ due to the positive refractive power of the emission surface 14a of the eyepiece 14.

The side 13b of the light guiding prism 13 or both of the sides 13a and 13b may have the characteristics of the side 13a described above. The case in which the side 13b has the characteristics described above is a case in which the intersection line of the second plane and the portion of the side 13b that is exposed from the housing 16 has a curved surface that overlaps a portion of a parabola (not illustrated). In this case, the attachable image display device 30 is configured such that the center of the display area of the virtual image of the display element 12 overlaps a focal point of the parabola, the virtual image being generated due to image light that passes through the incident surface 13j of the light guiding prism 13. In this configuration, image light reflected off the portion of the side 13b that is exposed from the housing 16 is collected due to the positive refractive power of the emission surface 14a of the eyepiece 14.

The attachable image display device 30 according to the second embodiment also makes it possible to remove or reduce a ghost image generated due to light reflected off the side 13a (or the side 13b) of the light guiding prism 13. Light reflected off the side 13a (or the side 13b) of the light guiding prism 13 becomes a collimated beam with an extremely low aberration, which prevents multiple reflections onto the outer peripheral surface in the light guiding prism 13.

In the attachable image display device 30, light reflected off the side 13a (or the side 13b) of the light guiding prism 13 is collected with the emission surface 14a of the eyepiece 14 into a position deviating from the pupil of the eye 19 of the user, which makes it possible to more definitely divert, from the pupil of the eye 19 of the user, reflected light that may generate a ghost image.

The intersection line of the second plane and the entire area of the side 13a (or the side 13b) may have a curved surface that overlaps a portion of a parabola. In this case, the attachable image display device 30 is configured such that the center of the display area of the virtual image of the display element 12 overlaps a focal point of the parabola, the virtual image being generated due to image light that passes through the incident surface 13j of the light guiding prism 13.

Figure 11:
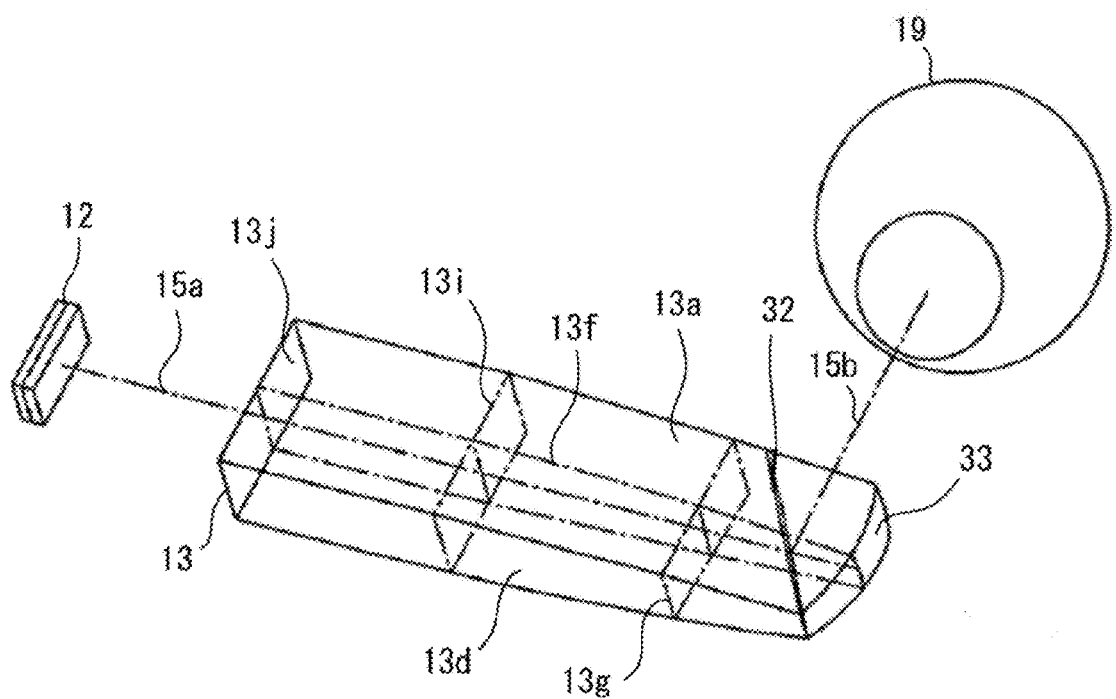
FIG. 11 is a perspective view of examples of the display element and the ocular optical system that are included in the attachable image display device according to a modification of the second embodiment.

The emission surface 14a of the eyepiece 14 does not have to have a positive refractive power. For example, in a modification of the present embodiment illustrated in FIG. 11, the light guiding prism 13 has a semi-transparent mirror 32 and a concave mirror 33 whose concave side is directed to the inside of the light guiding prism 13. A light path of light that is emitted from the center of the display area of the display element 12, passes through the light guiding prism 13, and enters the eye 19 of the user is described below in the modification. This light passes through the optical axis 15a and passes through the semi-transparent mirror 32 so as to be reflected off the concave mirror 33, and it goes back along the optical axis 15a toward the display element 12, is reflected off the semi-transparent mirror 32, and passes through the optical axis 15b, so as to be emitted from the light guiding prism 13 to the eye 19 of the user. This configuration also makes it possible to collect, into the fourth focal point $P_4$, image light reflected off the portion of the side 13a that is exposed from the housing 16 using a positive refractive power of the concave mirror 33, as illustrated in FIG. 10.

Figure 12:
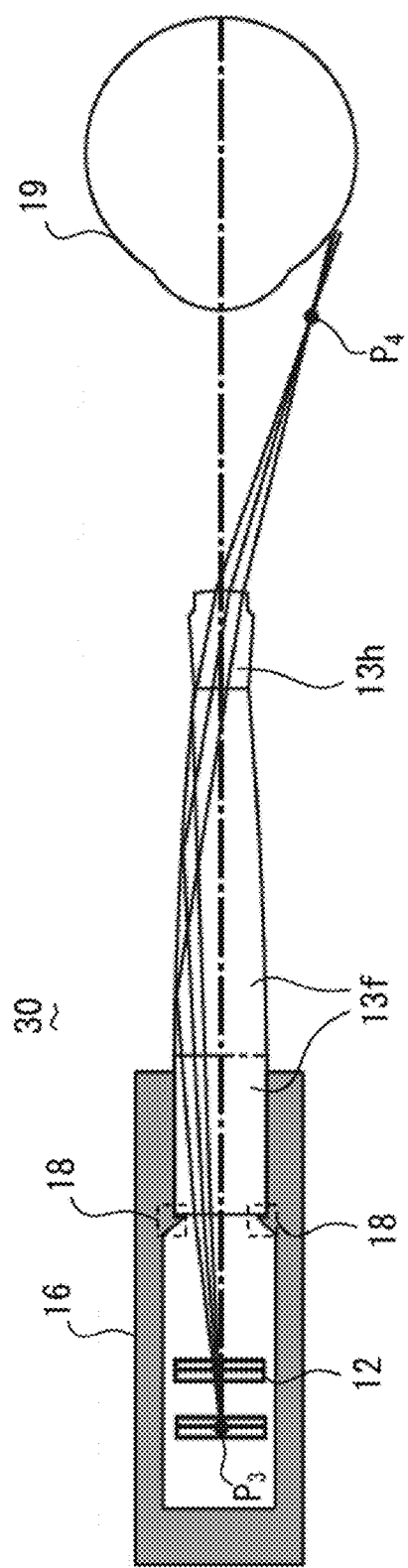
FIG. 12 illustrates an example of a light path that passes through the cross sections the ocular optical system, the light path being a dummy light path of image light that generates a virtual image on an extension of the display element according to another modification of the second embodiment.

As illustrated in FIG. 12, a light blocking portion 18 may be provided near an end of the light guiding prism 13 within the housing 16, the end being situated closest to the display element 12. The light blocking portion 18 has a function similar to that of the groove 17 according to the first embodiment, and makes it possible to remove, in advance, light reflected off the area of the outer peripheral surface so as to generate a ghost image, the area being situated closer to the display element 12.

An attachable image display device 40 according to a third embodiment of the present disclosure will now be described. The attachable image display device 40 according to the present embodiment is different from the attachable image display device 10 in that it includes a light guiding prism 43 instead of the light guiding prism 13, but the other points in the configuration are similar to those of the attachable image display device 10.

Figure 13:
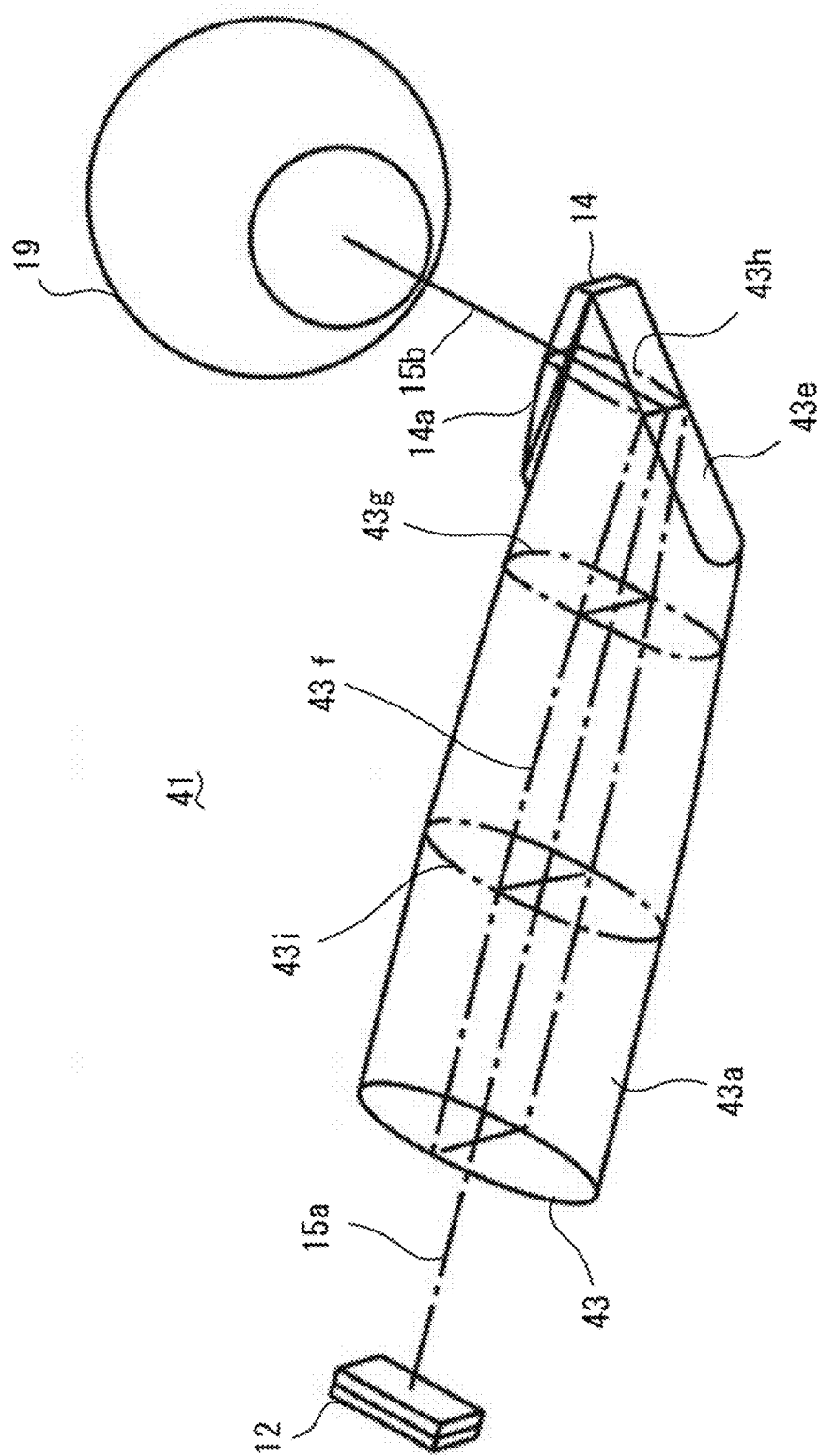
FIG. 13 is a perspective view of examples of the display element and the ocular optical system that are included in the attachable image display device according to a third embodiment.

FIG. 13 is a perspective view of examples of the display element 12 and an ocular optical system 41 that are included in the attachable image display device 40. The light guiding prism 43 has an outer peripheral surface 43a arranged to surround a light path of image light from the display element 12. The outer peripheral surface 43a is constituted of continuous curved surfaces and not sectioned with flat surfaces. Further, a portion of the outer peripheral surface 43a of the light guiding prism 43 is fixed by the housing 16, the portion being situated on the side of the display element 12.

A cross section 43i of the light guiding prism 43 is a cross section corresponding to a plane in a portion of the outer peripheral surface 43a that is fixed by the housing 16, the plane being perpendicular to the optical axis 15a. A cross section 43g of the light guiding prism 43 is a cross section corresponding to a plane in a portion of the outer peripheral surface 43a that is exposed from the housing 16, the plane being perpendicular to the optical axis 15a. The cross-sectional shapes of the cross sections 43g and 43i are each formed with a closed curve having no corners.

An intersection line of a plane including the optical axis 15a and the portion of the outer peripheral surface 43a that is exposed from the housing 16 has a negative inclination angle, and the tangential inclination angle of the intersection line becomes gradually larger from the upstream side to the downstream side of the optical axis 15a.

The attachable image display device 40 having the configuration described above makes it possible to remove or reduce a ghost image generated due to light reflected off the outer peripheral surface 43a of the light guiding prism 43. The attachable image display device 40 is not limited to the advantage of removing light reflected onto a surface arranged on an opposite side of the first plane, as in the first and second embodiments, but it makes it possible to remove or reduce light reflected onto an area in all directions of the outer peripheral surface 43a surrounding the optical axis 15a.

In the attachable image display device 40, a cross-sectional shape of the light guiding prism 43 has no corners, so the light guiding prism 43 is less likely to be partially broken when it is used. This permits a reduction in the occurrence of unnecessary light being reflected off the inside of the light guiding prism 43 due to the light guiding prism 43 being partially broken.

The attachable image display device 40 may be configured such that an intersection line of the outer peripheral surface 43a and the plane including the optical axis 15a has a negative inclination angle and the tangential inclination angle of the intersection line becomes gradually larger from the upstream side to the downstream side of the optical axis 15*a*.

The emission surface 14*a* of the eyepiece 14 may have a positive refractive power. If the emission surface 14*a* has a positive refractive power, this will act to collect more light reflected off the outer peripheral surface 43*a* to divert it from the pupil of the eye 19 of the user, which results in being able to remove or reduce a ghost image more effectively.

The attachable image display device 40 may be modified to have a configuration obtained by combining the configuration of the present embodiment and the configurations of the first and second embodiments. Specifically, the attachable image display device 40 may be configured such that the intersection line of the plane including the optical axis 15*a* and the portion of the outer peripheral surface 43*a* that is exposed from the housing 16 overlaps a portion of the circumference of an ellipse or a portion of a parabola. This makes it possible to remove or reduce a ghost image more effectively.

It has been described that the outer peripheral surface of the attachable image display device 40 is constituted of continuous curved surfaces, but as a modification, it may be constituted of a plurality of sides as in the first and second embodiments. For example, as illustrated in FIG. 5, the configuration may be made such that the outer peripheral surface of the light guiding prism 13 is constituted of the sides 13*a* to 13*d*, the intersection line of the second plane and each of the side 13*a* and the side 13*b* has a negative inclination angle to the optical axis 15*a*, an intersection line of the first plane and each of the side 13*c* and the side 13*d* has a negative inclination angle to the optical axis 15*a*, and the tangential inclination angle of each of the intersection lines becomes gradually larger from the upstream side to the downstream side. This configuration makes it possible to remove or reduce a ghost image generated due to light reflected off the side 13*a*, the side 13*b*, the side 13*c*, or the side 13*d* that constitutes the outer peripheral surface of the light guiding prism 13.

As explained above, embodiments of the present disclosure make it possible to remove or reduce a ghost image generated due to light reflected off a side of a light guiding prism.

The first to third embodiments described above are just examples to facilitate understanding of the present disclosure, and the present disclosure is not limited to these embodiments. Various modifications and alterations may be made to an attachable image display device and an ocular optical system without departing from the spirit and scope of the disclosure specified in the claims.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

In the appended claims, use of the phrase "means for" is intentionally used to invoke the "means-plus-function" language codified historically in 35 U.S.C. 112 § paragraph 6 (pre A1A) and now presently codified in 35 U.S.C. § 112(f). If the phrase "means for" is not found in a claim of the appended claims then it is intentionally absent from that claim and that claim should not be interpreted under 35 U.S.C. § 112(f).

What is claimed is:

1. An attachable image display device comprising:
a display element;
a light guiding prism, the light guide prism to guide image light from the display element; and
an emission portion, the emission portion to emit the image light guided by the light guiding prism, wherein the light guiding prism further comprising:
an outer peripheral surface, the outer peripheral surface is arranged to surround a light path of the image light;
a reflection surface, the image light to reflect from the reflection surface to the emission portion; and
a plane, the plane includes a first optical axis of the image light before the image light is reflected off the reflection surface, at least a portion of an intersection line formed between the outer peripheral surface and the plane has a negative inclination angle to the first optical axis in a direction downstream of the light path, and a tangential inclination angle of at least the portion of the intersection line becomes gradually larger from an upstream side to a downstream side of the light path.

2. The attachable image display device according to claim 1, wherein
a first plane includes the first optical axis and a second optical axis of the image light after the image light is reflected off the reflection surface,
a second plane includes the first optical axis and the second plane is perpendicular to the first plane,
at least a portion of an intersection line formed between the outer peripheral surface and the second plane has a negative inclination angle to the first optical axis in the direction downstream of the light path, and a tangential inclination angle of at least the portion of the intersection line formed between the outer peripheral surface and the second plane becomes gradually larger from the upstream side to the downstream side of the light path.

3. The attachable image display device according to claim 1, wherein
a first plane includes the first optical axis and a second optical axis of the image light after the image light is reflected off the reflection surface,
a second plane includes the first optical axis and the second plane is perpendicular to the first plane,
at least a portion of the intersection line formed between the outer peripheral surface and the second plane overlaps a portion of a circumference of an ellipse, and
a position of a virtual image generated when image light passes through an incident surface of the light guiding prism on an extension of the first optical axis and on the upstream side of the light path is approximately equal to a position of a first focal point of the ellipse.

4. The attachable image display device according to claim 1, wherein a first plane includes the first optical axis and a second optical axis of the image light after the image light is reflected off the reflection surface, a second plane includes the first optical axis and the second plane is perpendicular to the first plane, at least a portion of the intersection line formed between the outer peripheral surface and the second plane overlaps a portion of a parabola, and a position of a virtual image generated due to the image light that passes through an incident surface of the light guiding prism on an extension of the first optical axis and on the upstream side of the light path is approximately equal to a position of a focal point of the parabola.

5. The attachable image display device according to claim 1, wherein
the emission portion includes an emission surface that has a positive refractive power.

6. The attachable image display device according to claim 1, wherein
a first plane includes the first optical axis and a second optical axis of the image light after the image light is reflected off the reflection surface,
a third plane includes the second optical axis, the third plane is perpendicular to the first plane, at least a portion of an intersection line formed between the outer peripheral surface and the first plane has a positive inclination angle to the second optical axis in the direction downstream of the light path.

7. The attachable image display device according to claim 1, wherein
a first plane includes the first optical axis and a second optical axis of the image light after the image light is reflected off the reflection surface,
at least a portion of an intersection line formed between the outer peripheral surface and the first plane has a negative inclination angle to the first optical axis in the direction downstream of the light path, and a tangential inclination angle of at least the portion of the intersection line formed between the outer peripheral surface and the first plane becomes gradually larger from the upstream side to the downstream side of the light path.

8. The attachable image display device according to claim 1, wherein
a cross-sectional shape of the light guiding prism is constituted of a closed curve having no corners, the cross-sectional shape being formed by an intersection line of the outer peripheral surface and a plane perpendicular to the first optical axis.

9. An ocular optical system comprising:
a light guiding prism, the light guide prism to guide light; and
an emission portion, the emission portion to emit the light guided by the light guiding prism, wherein the light guiding prism further comprising:
an outer peripheral surface, the outer peripheral surface is arranged to surround a light path of the light;
a reflection surface, the light to reflect from the reflection surface to the emission portion; and
a plane, the plane includes a first optical axis of the light before the light is reflected off the reflection surface, at least a portion of an intersection line formed between the outer peripheral surface and the plane has a negative inclination angle to the first optical axis in a direction downstream of the light path, and a tangential inclination angle of at least the portion of the intersection line becomes gradually larger from an upstream side to a downstream side of the light path.

* * * * *